United States Patent

Saito et al.

[11] Patent Number: 5,786,965
[45] Date of Patent: *Jul. 28, 1998

[54] MAGNETO-RESISTANCE EFFECT MAGNETIC HEAD

[75] Inventors: Norio Saito; Kenichi Baba, both of Miyagi; Yutaka Soda, Kanagawa, all of Japan

[73] Assignee: Sony Corporation, Tokyo, Japan

[*] Notice: The term of this patent shall not extend beyond the expiration date of Pat. No. 5,661,620.

[21] Appl. No.: 829,731

[22] Filed: Mar. 31, 1997

Related U.S. Application Data

[63] Continuation of Ser. No. 480,792, Jun. 7, 1995, Pat. No. 5,661,620.

[30] Foreign Application Priority Data

Jun. 13, 1994 [JP] Japan ................................ 6-130649

[51] Int. Cl.⁶ .................................................. G11B 5/39
[52] U.S. Cl. .................................................. 360/113
[58] Field of Search ........................... 360/113; 338/32 R; 324/252

[56] References Cited

U.S. PATENT DOCUMENTS

| | | | |
|---|---|---|---|
| 4,639,808 | 1/1987 | Thornley | 360/113 X |
| 5,073,836 | 12/1991 | Gill et al. | 360/113 |
| 5,323,285 | 6/1994 | Smith | 360/113 |
| 5,661,620 | 8/1997 | Saito et al. | 360/113 |

FOREIGN PATENT DOCUMENTS

| | | | |
|---|---|---|---|
| A-0 598 342 | 5/1994 | European Pat. Off. | |
| A-63 181 108 | 7/1988 | Japan | 360/113 |
| A-06 4831 | 1/1994 | Japan | 360/113 |

*Primary Examiner*—Stuart S. Levy
*Assistant Examiner*—William J. Klimowicz
*Attorney, Agent, or Firm*—Hill & Simpson

[57] ABSTRACT

A magneto-resistance effect magnetic head in which the MR effects of the two MR thin films of a MR device are balanced for suppressing Barkhausen noise and assuring a stabilized output. Between a lower-layer magnetic shield core and an upper layer magnetic shield core is arranged an MR device, made up of two MR thin films such that a distance $d_1$ between the lower-layer magnetic shield core and the MR thin film is smaller than a distance $d_2$ between the upper-layer magnetic shield core and the MR thin film. A film thickness $t_1$ of the MR thin film towards the lower-layer magnetic shield core is set so as to be thinner than a film thickness $t_2$ of the MR thin film towards the upper-layer magnetic shield core. Preferably, the relation $0.5 < t_1/t_2$ holds. Also, a resistivity $\rho_1$ of the MR thin film closer to the lower layer magnetic shield core may be larger than a resistivity $\rho_2$ of the MR thin film. Preferably, the relation $\rho_1/\rho_2 > 3$ holds.

1 Claim, 6 Drawing Sheets

MAGNETO-RESISTANCE EFFECT MAGNETIC HEAD

This is a continuation of application Ser. No. 08/480,792 filed Jun. 7, 1995, now U.S. Pat. No. 5,661,620.

BACKGROUND OF THE INVENTION

The present invention generally relates to magneto-resistance effect magnetic heads. More particularly, the invention relates to a magneto-resistance effect thin films as a component of a magneto-resistance effect device.

A magneto-resistance effect magnetic head (MR head) employed as a playback head in a hard disc drive device, will have a magneto-resistance effect device (MR device) sandwiched between a pair of magnetic shield cores, with a non-magnetic layer in-between. The magnetic shield cores will be arranged with a gap therebetween on a medium-facing surface of the MR head.

With such an MR head, excess external magnetic field is shielded by the pair of magnetic shield cores in order to cause only the target external magnetic field to enter the MR device. Information signals are reproduced by taking advantage of the change in the resistance of the MR device caused by the external magnetic field. The gaps defined by the non-magnetic layers between the MR device and magnetic shield cores are termed playback gaps.

An MR device generally is comprised of two layers of magneto-resistance effect thin films (MR thin films) laminated with an insulating layer in-between. A forward electrode and a rear electrode are connected to the medium-facing side and the opposite side of the MR device, respectively. Sense current is caused to flow through these forward and rear electrodes. The MR head, the MR device of which has two MR thin films laminated one on the other with the insulating film in-between, is effective in suppressing Barkhausen noise and external static electricity.

Figure 5:
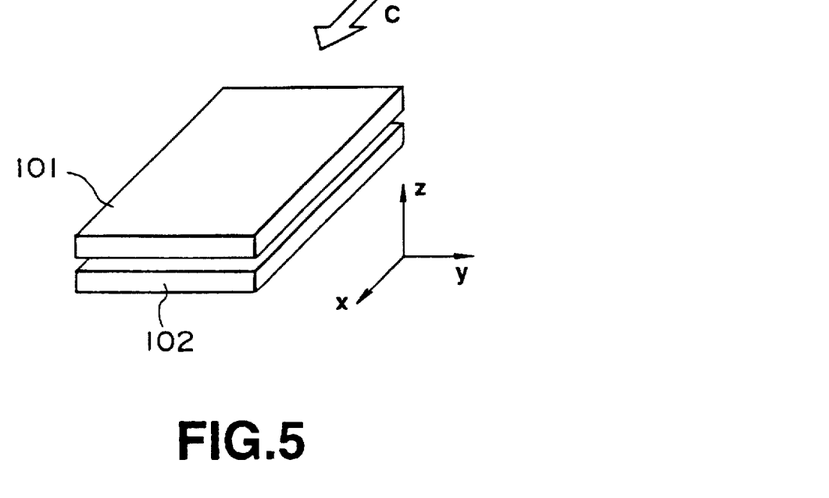
FIG. 5 is a schematic perspective view showing the manner in which sense current is caused to flow in two MR thin films.

The principle of reproduction by the MR head is shown in FIG. 5. If a sense current is caused to flow through two MR thin layers 101 and 102 in a direction x, magnetic fields, shown by arrows $Hs_1$ and $Hs_2$, are generated in the MR thin films 101 and 102, respectively, and this shown in FIG. 6, so that the direction of magnetization of the MR thin films 101 and 102 as indicated such as $Mo_1$ and $Mo_2$, which have directions $\phi_1$ and $\phi_2$ corresponding to the direction x of the sense current.

Figure 6:
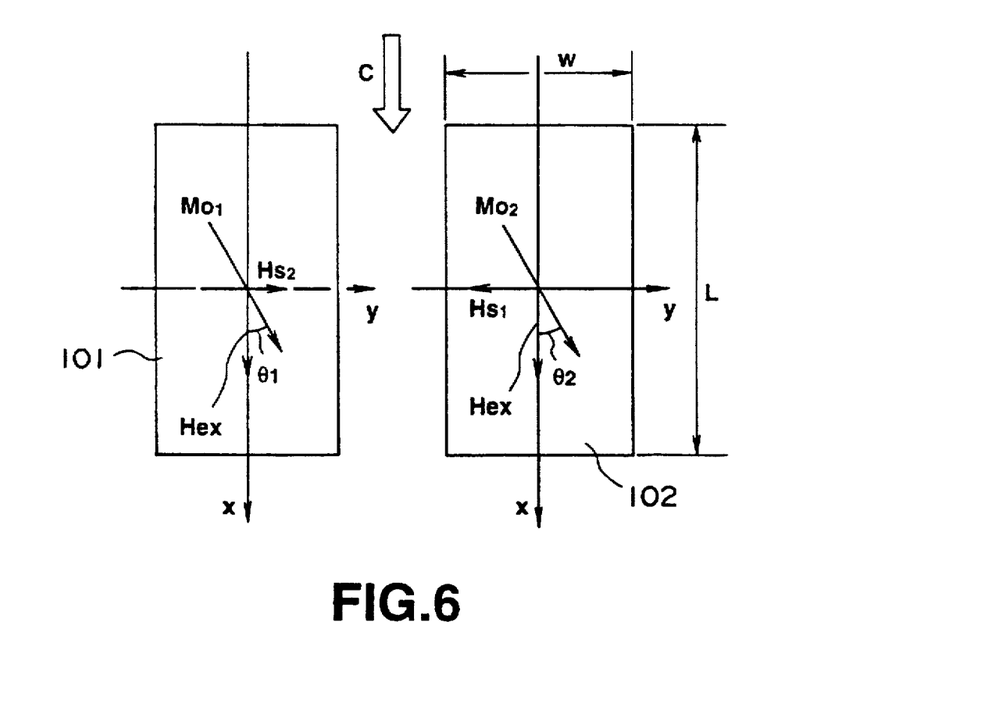
FIG. 6 is a schematic showing the relation of magnetization and the direction of the magnetic field in the two MR thin films.

If an external magnetic field shown by arrow Hex is now applied to the MR thin films 101 and 102, the directions of magnetization of the MR thin films 101 and 102 are rotated to those indicated by arrows $Mo_1$, $Mo_2$, respectively. The angles $\theta_1$ and $\theta_2$ included between the directions of magnetization $Mo_1$ and $Mo_2$ and the direction x correspond to the values of the strength of the magnetic fields applied to the MR thin films 101 and 102. The result is that the values of the electrical resistance of the MR thin films 101 and 102 are changed and the voltage changes corresponding to the amounts of the change of the electrical resistance are produced across both ends of the MR thin films 101 and 102. Information signals are reproduced by detecting these changes in voltage.

Figure 7A:
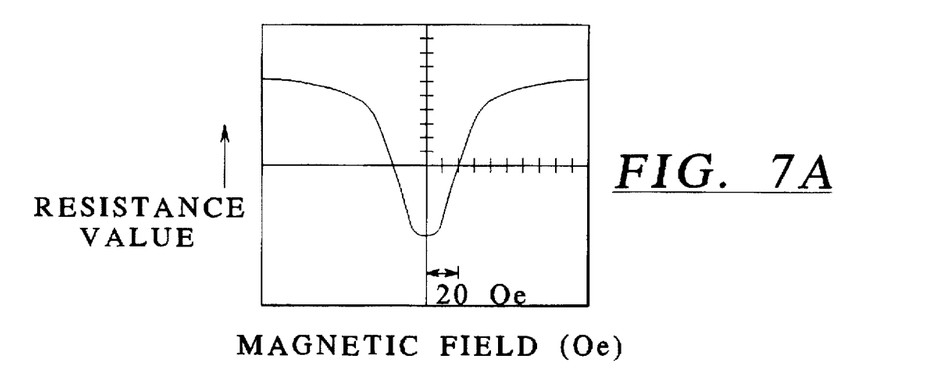
FIGS. 7A and B are graphs showing MR curves of the MR device.
Figure 7B:
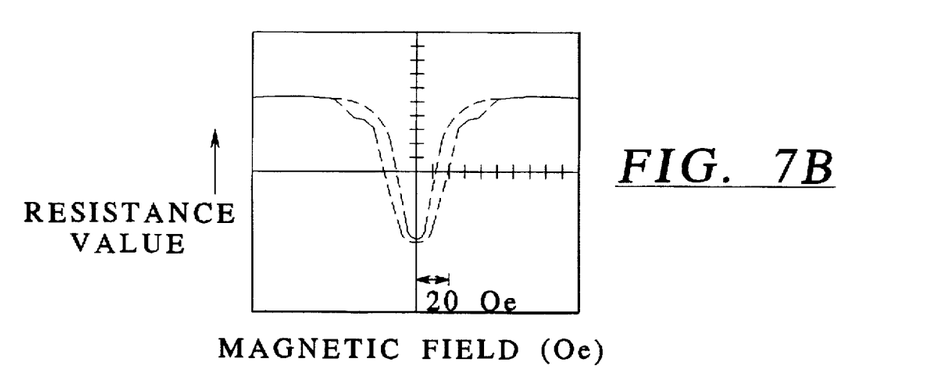

FIGS. 7A and 7B show MR curves of the MR thin films 101 and 102, with the length L of the MR films 101 and 102 along the direction x being 20 μm and with the length W of the MR films 101 and 102 along the direction y being 6 μm. In FIG. 6, the lengths L and W are shown only for the MR thin film 102. FIGS. 7A and 7B show the MR curves for the sense current of 10 mA and the sense current of 1 mA, respectively.

With the above-described MR head, attempts have been made towards reducing the width of the two gaps defined by insulating layers between a pair of magnetic shield cores and the MR device, that is the playback gaps.

With the above MR head, the two playback gap are not necessarily equal in size, but often are different from each other.

If the gap width is further reduced in such an MR head, the one of the two MR thin films making up the MR device which is closer to the magnetic shield core is magnetically coupled to the magnetic shield core and becomes a magnetically thick film, so that the probability becomes high that the MR effect becomes unbalanced between the two MR thin films.

This has been confirmed by the fact that, if the MR device of the MR head is constituted with one MR thin film, the MR device is magnetically coupled to be closer to one of the magnetic shield cores, such that the MR device has a sole magnetic domain to stabilize the behavior of the MR device.

Figure 8:
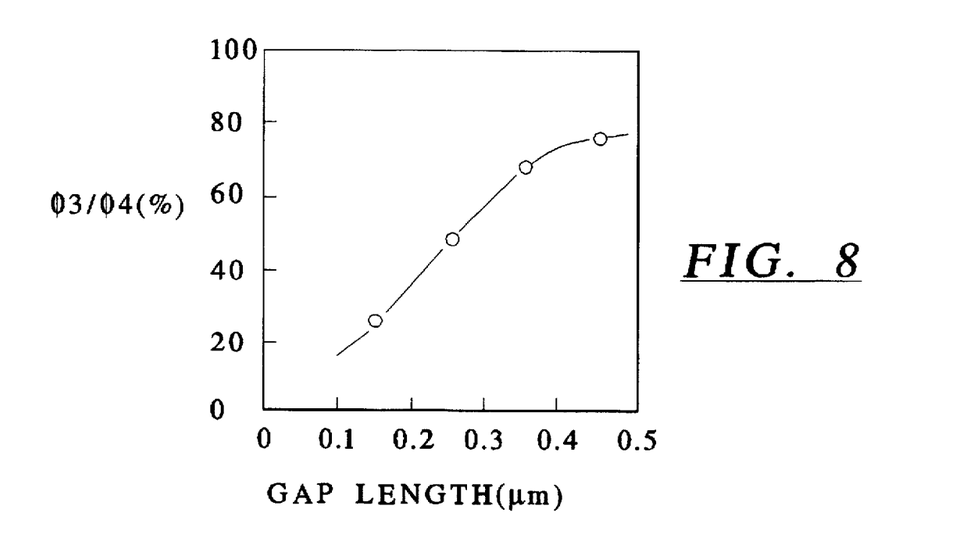
FIG. 8 is a graph showing the relation between gap width and ratio of magnetization.

FIG. 8 shows the results of calculations of changes in the ratio of magnetization of two MR thin films making up the MR device when one of the gap widths of the MR head is changed. The ratio of magnetization is expressed as the ratio of magnetization ($\phi_3$), the gap width for which has been changed, to magnetization, ($\phi_4$) of the remaining MR thin film. In the drawing, the abscissa, and the ordinate denote the gap width and the ratio of magnetization $\phi_3/\phi_4$, respectively.

The results of FIG. 8 show that, if one of the gap widths is not larger than about 0.3 μm, the ratio of magnetization of the two MR thin films cannot reach 60%, so that magnetization of the MR thin film the gap width for which has been changes is not sufficient. That is, the MR thin film is magnetically coupled with the magnetic shield core to form a magnetically thick film, thus unbalancing the magnetization between the two MR thin films, in other words, unbalancing the MR effect.

If the MR effect of the two MR thin films making up the MR device is unbalanced, Barkhausen noise tends to be produced to render the output unstable.

Figure 9A:
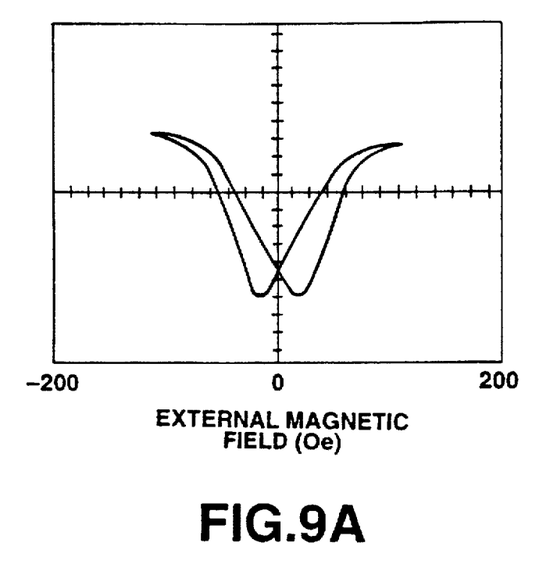
FIGS. 9A and B are graphs showing MR curves two MR thin films making up the MR device where MR effects are unbalanced.
Figure 9B:
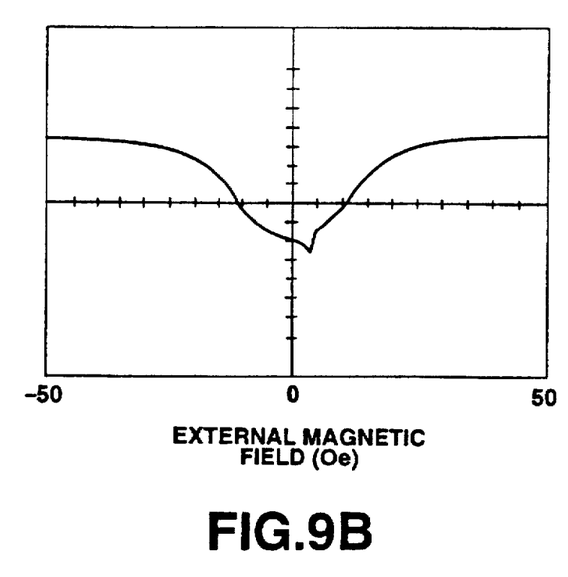

FIGS. 9A and 9B show MR curves when the MR effect of the two MR thin films making up the MR device is intentionally unbalanced. FIG. 9 shows an MR curve of the external magnetic field derived from experimentation. FIG. 9B shows an MR curve derived from simulation. It is seen from the results of FIG. 9B that skipping occurs in the region of lower intensity of the magnetic field, as indicated by encircled area S. Thus, it is seen that if the MR effect between the two MR thin films is unbalanced, the Barkhausen noise is produced to render the output unstable.

SUMMARY OF THE INVENTION

It is an object of the present invention to provide a magneto-resistance effect magnetic head in which, when the MR device is made up of two MR thin films, and the MR effect of the MR thin films positioned between two shield cores is maintained in a balanced state to suppress the occurrence of Barkhausen noise so as to render the output stable.

In an embodiment, the invention provides that one of the two MR thin films of the MR device is closer to a shield core than the other thin film is to the other shield core, the MR thin film closer to a magnetic shield core is magnetically coupled with that the magnetic shield core so as to effectively produce magnetically thick film. If the external magnetic field of a given strength enters the MR thin film, part of the external magnetic field is leaked towards the magnetic shield core, so that the MR effect of the MR thin film becomes lower than when the external magnetic field of the same intensity enters the remaining MR thin film. However, as a result of extensive investigations, the present inventors have found that it is sufficient if the resistance of the MR thin film closer to a magnetic shield core is higher than that of the remaining MR thin film, so that no difference will exist in the MR effect between the two MR thin films.

In one aspect, the present invention thus provides a magneto-resistance effect magnetic head having a magneto-resistance effect device interposed between a pair of magnetic shield cores, in which the magneto-resistance effect device is made up of two magneto-resistance effect thin films laminated with an insulating layer in-between. One of the magneto-resistance effect thin films is disposed closer to a magnetic shield core than is the other magneto-resistance effect thin film and it is thinner in film thickness than the other of the magneto-resistance effect thin films which is farther from a magnetic shield core.

With the magneto-resistance effect magnetic head, if the film thickness of the magneto-resistance effect thin film closer to the magnetic shield core is $t_1$ and the film thickness of the magneto-resistance effect thin film further from the magnetic shield core is $t_2$, the relation $0.5 < t_1/t_2 < 0.7$ preferably holds.

In another aspect, the present invention provides a magneto-resistance effect magnetic head having a magneto-resistance effect device interposed between a pair of magnetic shield cores. The magneto-resistance effect device is made up of two magneto-resistance effect thin films laminated with an insulating layer in-between. The one of the two magneto-resistance effect thin films making up the magneto-resistive effect device which is disposed closer to a magnetic shield core is higher in resistivity than the other of the magneto-resistance effect thin films which is farther from a magnetic shield core.

With the magneto-resistance effect magnetic head, if the resistivity of the magneto-resistance effect thin film closer to the magnetic shield core is $\rho_1$ and resistivity of the magneto-resistance effect thin film further from the magnetic shield core is $\rho_2$, the relation $\rho_1/\rho_2 > 3$ preferably holds.

With the magneto-resistive effect magnetic head of the present invention, the one of the two magneto-resistance effect thin films making up the magneto-resistance effect device which is disposed closer to a magnetic shield core may be thinner in film thickness than the other of the magneto-resistance effect thin films which is farther from a magnetic shield core.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

With the magneto-resistive effect magnetic head of the present invention, the one of the two magneto-resistance effect thin films of the magneto-resistance effect device which is disposed closer to the magnetic shield core is thinner in film thickness than the other of the magneto-resistance effect thin films which is farther from the magnetic shield core. Thus, the magneto-resistance effect thin film closer to the magnetic shield core is challenged by higher resistance, so that, if the gap width is reduced and the magneto-resistance effect thin film is magnetically coupled with the magnetic shield core, the level of magnetization of the two magneto-resistance effect thin films becomes equal, this rendering it possible to maintain the equilibrium of the MR effect of the magneto-resistance effect thin films.

On the other hand, with the magneto-resistive effect magnetic head of the present invention, the one of the two magneto-resistance effect thin films making up the magneto-resistive effect device which is disposed closer to the magnetic shield core is higher in resistivity than the other of the magneto-resistance effect thin films which is farther from the magnetic shield core. Thus, the magneto-resistance effect thin film closer to the magnetic shield core exhibits higher resistance, so that, if the gap width is reduced and the magneto-resistance effect thin film is magnetically coupled with the magnetic shield core, the level of magnetization of the two magneto-resistance effect thin films becomes equal, this rendering it possible to maintain the equilibrium of the MR effect of the magneto-resistance effect thin films.

Referring to the drawings, preferred embodiments of a magneto-resistance effect magnetic head according to the present invention are explained in detail. Generally, the magnetic head of the present embodiment is a composite magnetic head comprised of a MR head having a magneto-resistance effect magnetic sensitive portion sandwiched between a pair of magnetic shield cores and an inductive head having a thin film magnetic core formed on one of the magnetic shield cores and a recording coil formed between the thin-film magnetic core and the magnetic shield core.

Figure 1:
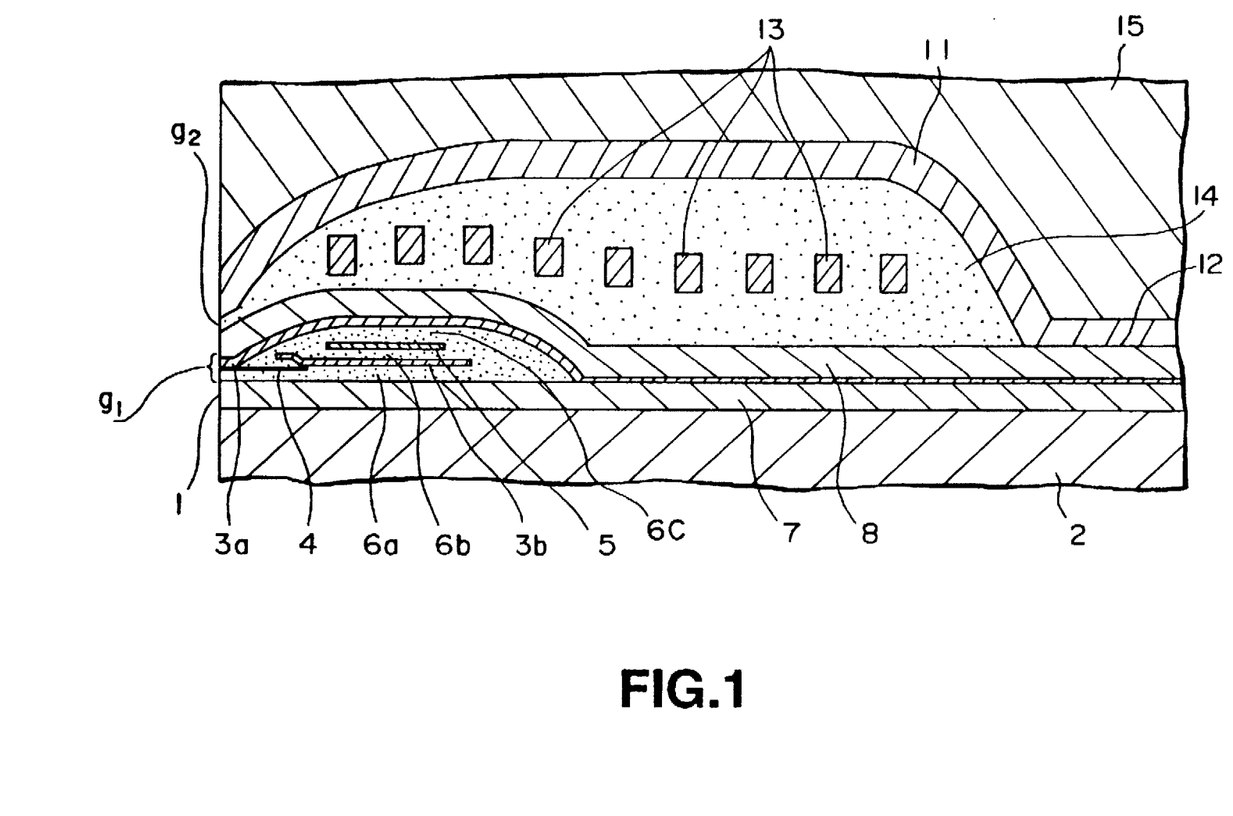
FIG. 1 is a cross-sectional view showing an arrangement of a composite magnetic head embodying the present invention.

Referring first to FIG. 1, the exemplary composite magnetic head is a two-gap recording/reproducing head in which an MR head having a reproducing gap $g_1$ exposed to a medium-facing surface 1 and an inductive head having a recording magnetic gap $g_2$ similarly exposed to the medium facing surface 1. The MR head and the inductive head are laminated on one of the major surfaces of a slider 2 comprised of an $Al_2O_3$—TiC base plate.

The MR head is made up of a magneto-resistance effect magnetic sensitive portion sandwiched between a lower layer magnetic shield core 7 and an upper layer magnetic shield core 8 of a soft magnetic material via non-magnetic layers 6a and 6b. The magneto-resistance effect magnetic sensitive portion is made up of a magneto-resistance effect device (MR device) 4, on the forward and rear portion of which are laminated a pair of electrodes 3a and 3b for supplying the sense current from a constant current source, not shown, and a bias conductor 5 for affording the magnetized state of a pre-set direction of magnetization to the MR device 4. The electrode formed on the side of the medium-facing surface 1 and the electrode formed on the opposite side are herein termed a forward electrode 3 and a rear electrode 4, respectively. The soft magnetic material may be exemplified by permalloy and may be a crystal or amorphous material, whichever is desired.

The lower magnetic shield core 7, formed on the lower surface of the MR device 4, is formed on the slider 2 for extending in a direction sub-stantially orthogonal to the medium-facing surface 1, via an insulating layer, not shown, so that its one end is exposed to the medium-facing surface 1.

The upper magnetic shield core 8, formed facing the lower magnetic shield core 7, is formed similarly to the lower magnetic shield core 7, that is for extending in a direction substantially orthogonal to the medium-facing surface 1, via an insulating layer, so that its one end is exposed to the medium-facing surface 1.

The MR device 4 is formed as a rectangular pattern having a width slightly smaller than the track width of the recording magnetic gap $g_2$ of the inductive head, so that its longitudinal direction is orthogonal to the medium-facing surface 1, with a end edge of the pattern being exposed to the medium-facing surface 1.

Figure 2:
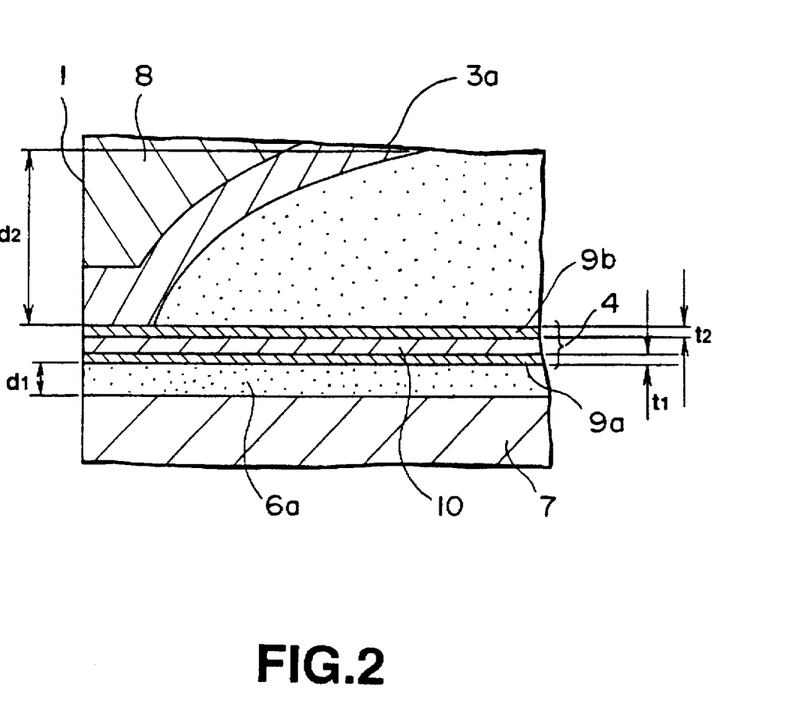
FIG. 2 is an enlarged cross-sectional view showing portions of an MR device of the composite MR head embodying the present invention.

In the present embodiment, the MR device 4 is made up of two magneto-resistance effect films (MR thin films) 9a and 9b magnetically coupled to each other and laminated on the other with a non-magnetic insulating layer 10 in-between, for evading the generation of Barkhausen noise, as shown in FIG. 2. The MR thin film arranged on the side of the lower magnetic shield core 7 is denoted as an MR thin film 9a, and the MR thin film arranged on the side of the upper magnetic shield core 8 is denoted as an MR thin film 9b. These MR thin films 9a and 9b are formed of a magnetic material.

In the present embodiment, the gap width, which is the distance, as measured on the medium-facing surface 1, between the MR thin film 9a and the lower magnetic shield core 7, that is the thickness of the non-magnetic layer 6a, is selected to be smaller than the distance, as measured on the medium-facing surface 1, between the MR thin film 9b and the upper magnetic shield core 8, that is the thickness of the forward electrode 3a. Thus, a distance $d_1$ between the lower magnetic shield core 7 and the MR thin film 9a is smaller than a distance $d_2$ between the upper magnetic shield core 8 and the MR thin film 9b, such that the lower magnetic shield core 7 is closer to the MR thin film 9a than the magnetic shield core 8 is to the magnetic thin film 9b.

In addition, with the present embodiment, the MR thin film 9a formed on the lower magnetic shield core 7 is selected to be thinner in film thickness than the MR thin film 9b formed on the upper magnetic shield core 8. That is, the film thicknesses of the MR thin films 9a and 9b are so set that, with the film thicknesses of the MR thin film 9a on the lower magnetic shield core 7 and the MR thin film 9b on the upper magnetic shield core 8 being set to $t_1$ and $t_2$, respectively, the relation $0.5 < t_1/t_2 < 0.7$ holds.

The bias conductor 5 is formed as a rectangular interconnect pattern in plan and is laminated on the MR device 4, with a pre-set distance in-between, via the insulating layer 6b. The bias conductor 5 is formed in a direction substantially orthogonal to the MR device 4, namely the bias conductor 5 is formed to cross MR device 4. The bias current, a dc current, is supplied in the longitudinal direction of the bias conductor 5 so that a bias magnetic field is applied to the MR device 4 in a direction orthogonal to the medium-facing surface 1.

As for the inductive head, the recording gap $g_2$ is defined between the forward ends of the upper magnetic shield core 8 and a thin film magnetic core 11 laminated facing the upper magnetic shield core 8 so that the magnetic gap $g_2$ is exposed to the medium-facing surface 1. The upper magnetic shield core 8 plays the part of a counterpart thin film magnetic core of the thin film magnetic core for defining a closed magnetic path. The thin-film magnetic core 11 is magnetically contacted at the rear end of the head with the upper magnetic shield core 8 for constituting a back gap, not shown.

In a magnetic coupling portion 12 between the thin layer magnetic core 11 and the upper magnetic shield core 8, there is provided a spirally extending recording coil 13 for surrounding the magnetic coupling portion 12. The recording coil 13 is embedded in an insulating layer 14 for assuring insulation with respect to the thin film magnetic core 11 and the upper-layer magnetic shield core 8. On the top of the thin-film magnetic core 11, there is similarly mounted an insulating layer 15 as a protective film for protecting the inductive head and the MR head laminated on the slider 2.

With the MR head of the composite magnetic head, the distance $d_1$ between the MR thin film 9a and the lower magnetic shield core 7 is selected to be lesser than the distance $d_2$ between the MR thin film 9b and the upper-layer magnetic shield core 8, such that, with the film thickness $t_1$ of the MR thin film 9a and the film thickness $t_2$ of the MR thin film 9b, the relation $0.5 < t_1/t_2 < 0.7$ holds.

Thus, with the MR head of the present embodiment, the resistance of the MR thin film 9a becomes higher, such that, even if the distance $d_1$ is diminished by reducing the gap width and the MR thin film 9a is magnetically coupled to the lower-layer magnetic shield core 7, the two MR thin films 9a and 9b are on the same level of magnetization, so that it becomes possible to maintain the equilibrium of the MR effect of the MR thin films 9a and 9b. That is, it becomes possible with the present MR head to suppress the generation of Barkhausen noise so that the output becomes stable and thus the composite magnetic head of the present embodiment has good operating characteristics.

For ascertaining the characteristics of the MR head of the present embodiment, the following simulation was conducted. MR heads were fabricated with the film thickness of the MR thin film 9b on the side of the upper-layer magnetic shield core 8 being set to 300 Å and with the distance $d_1$ between the MR thin film 9a and the lower magnetic shield-core 7 being set to 0.25 µm, for various film thicknesses of the MR thin film 9a on the side of the lower-layer magnetic shield core 7, and calculations were made of the ratio of magnetization of the MR thin films 9a and 9b of the respective MR heads. The ratio of magnetization is denoted by the ratio of the magnetization $\phi_1$ of the MR thin film 9a to the magnetization $\phi_2$ of the MR thin film 9b. The results are shown in FIG. 3, in which the abscissa denotes the film thickness of the MR thin film 9a and the ordinate denotes the ratio of magnetization denoted as $\phi_1/\phi_2$.

Figure 3:
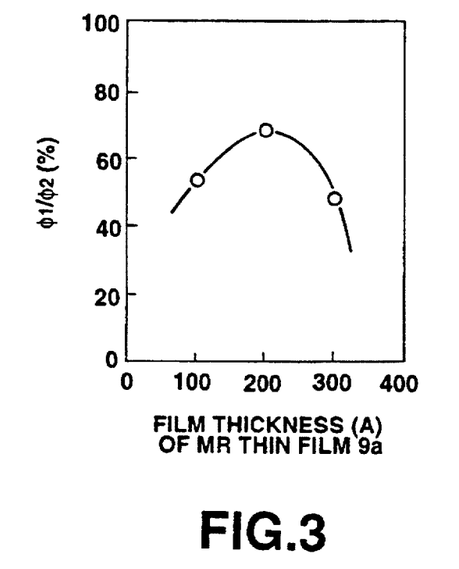
FIG. 3 is a graph showing the relation between film thickness of a thin MR film and magnetization ratio.

It is seen from the results of FIG. 3 that, while the ratio of magnetization is gradually increased with increase in the film thickness of the MR thin film 9a until the film thickness of the MR thin film 9a becomes equal to 210 Å, the ratio of magnetization abruptly decreases when the film thickness reaches 210 Å. Accordingly, with such MR head, the film thickness of the MR thin film 9a needs to be thinner than 210 Å in order to maintain the equilibrium of magnetization of the MR thin films 9a and 9b of the two layers, that is the equilibrium of the MR effects.

Meanwhile, with the above-described magnetic head, it is necessary for the equilibrium of magnetization of the MR thin films 9a and 9b making up the MR device 4, that is the ratio $\phi_1/\phi_2$, to be not less than 60%, for stabilizing the characteristics of the MR head. Thus it is seen from the result of FIG. 3 that the film thickness of the MR thin film 9a need to be larger than 150 Å.

It is seen from the above results that, with the above MR head, with the film thickness $t_1$ of the MR thin film 9a and with the film thickness $t_2$ of the MR thin film 9b, it is necessary for the relation $0.5 < t_1/t_2$ to hold.

It is seen that, since the above condition is met with the MR head of the present embodiment, the equilibrium of the MR effects of the MR thin films 9a and 9b is maintained, thus leading to suppression of Barkhausen noise and a stabilized output.

With the MR head of the present embodiment, the MR device 4 is improved in sensitivity.

For example, if the film thicknesses $t_1$ and $t_2$ of the MR thin films 9a and 9b of the MR device 4 are 20 nm and 30 nm, respectively, the width W of the MR device 4 is 3 μm, the length L of the MR device 4 is 10 μm, resistivity ρ of the MR device 4 is $3\times10^{-5}$ ohm/cm and the rate of change of resistance is 2%, the maximum rate of change of resistance is expressed by the following equation (1):

$$C_1 = \rho_x \frac{L}{(t_1 + t_2) \times W} \times 0.02 \quad (1)$$

so that the maximum change of resistance $C_1$ becomes equal to 0.4 ohm.

For comparison, the maximum rate of change of resistance $C_1$ for the same film thicknesses $t_1$ and $t_2$ of the MR thin films 9a and 9b of e.g., 30 nm, as in the case of the conventional MR head, was calculated by the equation (1), and found to be 0.33 ohm. That is, the maximum change of resistance $C_1$ of the present MR head is improved by 20% over that of the conventional MR head, thus indicating the improved sensitivity of the present MR head.

If the maximum change of resistance $C_1$ is improved in this manner, the resulting output is improved for the same sense current intensity. In the present embodiment, such improvement amounts to approximately 20%.

With the MR head of the present embodiment, the resistance of the MR thin film 9a is raised by reducing the thickness $t_1$ of the MR thin film 9a as compared to the thickness $t_2$ of the MR thin film 9b for increasing the resistance of the MR thin film 9a, so that, even if the MR thin film 9a is magnetically coupled to the lower-layer magnetic shield core 7, the two MR thin films 9a and 9b are on the same level of magnetization, thereby maintaining the equilibrium of the MR effects of the MR thin films 9a and 9b.

That is, with the above-described MR head, the equilibrium of the MR effect of the MR thin films 9a and 9b may be maintained by increasing the resistance of the MR thin film 9a of the MR device 4. Thus, with the above MR head, similar effects are presumably produced by setting the resistivity $\rho_1$ of the MR thin film 9a so as to be higher than the resistivity $\rho_2$ of the MR device 4.

For ascertaining the foregoing, the following simulation was conducted. That is, the MR device 4 was made up of MR thin films 9a and 9b, each 300 Å in film thickness, laminated together via a non-magnetic layer 10, 20 Å in thickness, the distance $d_1$ between the MR thin film 9a and the lower magnetic shield core 7 was set to 0.15 μm and the ratio of magnetization of the MR thin films 9a and 9b was calculated for various values of the ratio of resistivity of the MR thin films 9a and 9b. The ratio of resistivity was changed by changing the materials of the MR thin films 9a and 9b. With the value of resistivity of the MR thin films 9a and 9b of $\rho_1$ and $\rho_2$, respectively, and with the magnitudes of magnetization of the MR thin films 9a and 9b of $\phi_1$ and $\phi_2$, respectively, the ratio of resistivity and the ratio of magnetization of the MR thin films 9a and 9b were denoted by $\phi_1/\phi_2$ and $\phi_1/\phi_2$, respectively. The results are shown in FIG. 4, in which the abscissa and the ordinate denote the ratio of resistivity $\phi_1/\phi_2$ and the ratio of magnetization $\phi_1/\phi_2$, respectively.

Figure 4:
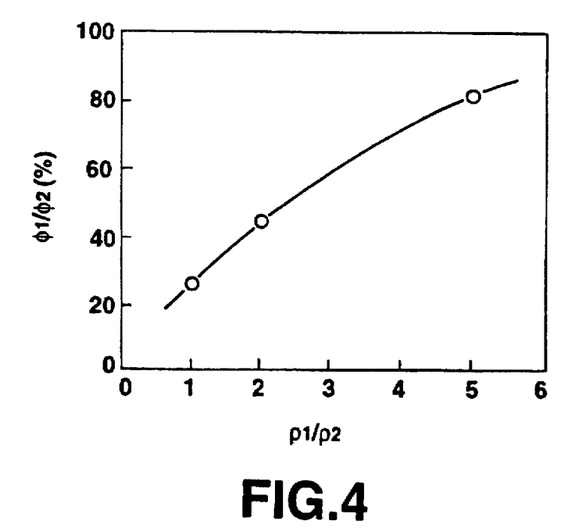
FIG. 4 is a graph showing the relation between the ratio of resistivity and the ratio of magnetization.

It is seen from the results of FIG. 4 that, if the ratio of resistivity $\rho_1/\rho_2$ is set so as to be 3 or more, the ratio of magnetization $\phi_1/\phi_2$ becomes equal to 60% or higher, with the result that the equilibrium of the MR effects of the MR thin films 9a and 9b may be maintained and the effects similar to those of the MR head of the above-described embodiment may be accrued. It has also been found that, if the ratio of resistivity $\rho_1/\rho_2$ is set so as to be 4 or larger, MR head characteristics may be improved further.

On the other hand, even if the resistivity of the MR thin films 9a and 9b of the MR device 4 is changed, the MR device may be improved in sensitivity. That is, with the values of resistivity $\rho_1$ and $\rho_2$ of the MR thin films 9a and 9b and with the values of magneto-resistance $\Delta\rho_1$ and $\Delta\rho_2$ thereof, the maximum change of resistance $C_1$ is derived from the relation for parallel resistances as shown by equation (2):

$$C_2 = \frac{1}{\left(\frac{1}{\rho_1 + \Delta\rho_1} + \frac{1}{\rho_2 + \Delta\rho_2}\right)} - \frac{1}{\left(\frac{1}{\rho_1} + \frac{1}{\rho_2}\right)} \quad (2)$$

Substituting $\rho_1 = 1.5\times10^{-4}$ ohm/cm, $\rho_2 = 3\times10^{-5}$ ohm/cm, $\Delta\rho_1 = 0$ ohm cm and $\Delta\rho_2$ is $6\times10^{-7}$ into the equation (2). When the width of MR device and the length of MR device are 3 μm and 10 μm, respectively, the maximum change of resistance $C_2$ is 0.46 Ω. Next, for comparison, as the conventional MR head, the maximum change of resistance $C_2$ for the same values of the resistivity $\rho_1$ and $\rho_2$ of the MR thin films 9a and 9b, such as $3\times10^{-5}$ Ω/cm is calculated to be 0.33 Ω from the equation (2). That is, with the present embodiment of the MR head, the maximum change of resistance $C_2$ is 1.4 times that of the conventional MR head, thus indicating improved sensitivity.

If the maximum change of resistance $C_2$ is improved in this manner, the output is increased for the sense current of the same intensity. In the present embodiment, the output is improved by a factor of 1.4.

With the above-described MR head, the same effect as that of the previous embodiment may be accrued when not only the film thicknesses $t_1$ and $t_2$ of the MR thin films 9a and 9b but also the values of resistivity $\rho_1$ and $\rho_2$ thereof are changed.

It can be appreciated that the present invention provides a magneto-resistance effect magnetic head having a magneto-resistance effect device interposed between a pair of magnetic shield cores, which magneto-resistance effect device is made up of two magneto-resistance effect thin films laminated with an insulating layer in-between, wherein the one of the magneto-resistance effect thin films which is disposed closer to the magnetic shield core is thinner in film thickness than the other of the magneto-resistance effect thin films. Consequently, the resistance of the magneto-resistance effect thin film closer from the magnetic shield core is increased, such that, when the magneto-resistance effect thin film is magnetically coupled to the magnetic shield core as a result of reduction of the gap width, the two magneto-resistance effect thin films are magnetized to approximately the same level to enable the equilibrium of the MR effects of the magneto-resistance effect thin films to be maintained so as to suppress the Barkhausen noise and to assure stabilized output and optimum operating characteristics.

If, with the magneto-resistance effect magnetic head of the present invention, having the film thickness of the magneto-resistance effect thin film closer to the magnetic shield core equal to $t_1$ and the film thickness of the magneto-resistance effect thin film further from the magnetic shield core equal to $t_2$, the relation $0.5<t_1/t_2<0.7$ holds, the equilibrium of the MR effects may be improved further to suppress the Barkhausen noise and to assure further stabilized output and improved characteristics.

The present invention also provides a magneto-resistance effect magnetic head having a magneto-resistance effect device interposed between a pair of magnetic shield cores, which magneto-resistance effect device is made up of two magneto-resistance effect thin films laminated with an insulating layer in-between, wherein the one of the two magneto-resistance effect thin films making up the magneto-resistive effect device which is disposed closer to the magnetic shield core is higher in resistivity than the other of the magneto-resistance effect thin films. Consequently, the resistance of the magneto-resistance effect thin film closer from the magnetic shield core is increased, such that, when the magneto-resistance effect thin film is magnetically coupled to the magnetic shield core as a result of reduction of the gap width, the two magneto-resistance effect thin films are magnetized to approximately the same level to enable the equilibrium of the MR effects of the magneto-resistance effect thin films to be maintained so as to suppress Barkhausen noise and to assure stabilized output and optimum operating characteristics.

If, with resistivity of the magneto-resistance effect thin film closer to the magnetic shield core being $\rho_1$ and resistivity of the magneto-resistance effect thin film further from the magnetic shield core being $\rho_2$, the relation $\rho_1/\rho_2>3$ holds, the equilibrium of the MR effects of the magneto-resistance effect thin films may be maintained more satisfactorily so as to suppress the Barkhausen noise further and to assure a further stabilized output and optimum operating characteristics.

Although modifications and changes may be suggested by those skilled in the art, it is the intention of the inventors to embody within the patent warranted hereon all changes and modifications as reasonably and properly come within the scope of their contribution to the art.

We claim:

1. A magneto-resistance effect magnetic head having a magneto-resistance effect device interposed between first and second magnetic shield cores, said magneto-resistance effect device being made up of first and second magneto-resistance effect thin films laminated with an insulating layer in-between, said first magneto-resistance effect thin film being disposed closer to said first magnetic shield core than said second magneto-resistance effect thin film is disposed relative to said second magnetic shield core, said first magneto-resistance effect thin film being thinner in film thickness and having a higher resistivity than said second magneto-resistance effect thin film, the first magnetic shield core being disposed on a substrate as a lower shield core, wherein, the first magneto-resistance effect thin film has a film thickness $t_1$, and the second magneto-resistance effect thin film has a film thickness $t_2$, such that $0.5<t_1/t_2<0.7$, and the first magneto-resistance effect thin film has a resistivity $\rho_1$ that is at least about 3 times greater than a resistivity of $\rho_2$ of the second magneto-resistance effect thin film.

* * * * *